United States Patent
Hine et al.

(10) Patent No.: US 7,357,324 B2
(45) Date of Patent: Apr. 15, 2008

(54) SYSTEM, METHOD, AND PROGRAM FOR GENERATING BARCODE DATA

(75) Inventors: Yoichi Hine, Tokyo (JP); Toshinori Nojima, Tokyo (JP); Takeshi Hosokawa, Suwa (JP)

(73) Assignees: King Jim Co., Ltd. (JP); Seiko Epson Corporation (JP)

( * ) Notice: Subject to any disclaimer, the term of this patent is extended or adjusted under 35 U.S.C. 154(b) by 481 days.

(21) Appl. No.: 11/036,175

(22) Filed: Jan. 18, 2005

(65) Prior Publication Data

US 2005/0178837 A1    Aug. 18, 2005

(30) Foreign Application Priority Data

Jan. 29, 2004    (JP) .............................. 2004-021463

(51) Int. Cl.
*G06K 7/10* (2006.01)

(52) U.S. Cl. ..................... 235/462.01; 235/462.09; 235/462.08

(58) Field of Classification Search ........... 235/462.01, 235/462.09, 462.08, 462.25
See application file for complete search history.

(56) References Cited

U.S. PATENT DOCUMENTS

| | | | | |
|---|---|---|---|---|
| 4,685,702 A | * | 8/1987 | Kazuharu | 283/81 |
| 5,023,438 A | * | 6/1991 | Wakatsuki et al. | 235/462.46 |
| 5,513,264 A | * | 4/1996 | Wang et al. | 380/51 |
| 5,557,092 A | * | 9/1996 | Ackley et al. | 235/462.07 |
| 5,811,781 A | * | 9/1998 | Ackley | 235/462.01 |
| 2006/0054695 A1 | * | 3/2006 | Owada | 235/440 |

FOREIGN PATENT DOCUMENTS

| | | |
|---|---|---|
| JP | 57-023144 | 2/1982 |
| JP | 05-307626 | 11/1993 |
| JP | 07-234906 | 9/1995 |
| JP | 2003-341196 | 3/2003 |

* cited by examiner

*Primary Examiner*—Ahshik Kim
(74) *Attorney, Agent, or Firm*—Bacon & Thomas, PLLC

(57) ABSTRACT

Misunderstanding is not caused among users such that the user misconstrues a special digit character of barcode data which is not directly input by the user as an input character or misconstrues the input character as the special digit character. In the invention, the input character string is displayed in a first display area and information on the special digit character is displayed in a second display area. At this point, it is preferable to notify the user that a position of a cursor in the first display area is located at the position of the special digit character by displaying the information displayed in the second display area in a mode which is different from the display mode of other cursor positions.

12 Claims, 8 Drawing Sheets

SYSTEM, METHOD, AND PROGRAM FOR GENERATING BARCODE DATA

CROSS-REFERENCE TO RELATED APPLICATION

This application claims, under 35 USC 119, priority of Japanese Application No. 2004-21463 filed Jan. 29, 2004.

BACKGROUND OF THE INVENTION

1. Field of the Invention

The present invention relates to a system, a method, and a program for generating barcode data. For example, the system, the method, and the program can be applied to a tape printing apparatus having functions of inputting and printing the barcode. The term of "barcode" means not only a usual barcode but also a two-dimensional barcode.

2. Description of the Related Art

Usually the tape printing apparatus has a function of printing the barcode. In such tape printing apparatuses, a method for inputting a character string which is expressed by the barcode and a method for processing the character string are pursuant to a standard of the barcode dealt with.

For example, in the barcode standard referred to as NW-7 (JIS-X-0503), a check digit (also referred to as check character) for the input character string is defined so as to be inserted not into the end of the character string but into a midpoint of the character string. Therefore, in the tape printing apparatus compatible with the barcode standard, a value of the check digit is determined by computing based on the input character string, and the value of the check digit is displayed in the corresponding position at the midpoint of the character string.

A method in which, in moving a cursor, the position of the check digit is not set to a cursor stop position but the cursor is moved to the character next to the check digit in a moving direction has been proposed (Japanese Patent Application Laid-Open No. 7-234906) when the check digit is displayed as described above.

However, in the display state of a series of characters strings including the check digit, users often have a feeling that something is wrong for the movement in which the cursor jumps the check digit, when the cursor is moved across the check digit. For example, a user who is a beginner of barcode input but familiar with a character-information processing apparatus such as a word processor is surprised that the cursor automatically jumps one character, and sometimes the user misconstrues the cursor jump as operation failure.

Originally the check digit is the necessary information when barcode data is read with a barcode reader to validate the data. Some of the users think it is not always necessary for the user who performs the printing that the check digit is displayed in the series of character strings, and some of the users do not know existence of the check digit itself. Sometimes such users have the feeling that something is wrong for the cursor movement caused by the display of the check digit in the series of character strings (the movement in which the cursor jumps the check digit).

Therefore, there is a demand for the system, the method, and the program for producing barcode data which can provide a display mode or a display change, which does not cause a misunderstanding for the users, with respect to the display of the character string including a special digit character which is not directly input by an operator.

SUMMARY OF THE INVENTION

A system for producing barcode data of the invention having inputting means for inputting a character string defined by a barcode standard, displaying means for displaying the input character string, and barcode data producing means for producing barcode data including the input character string and a check digit not directly input by an operator, the system for producing barcode data includes display controlling means for displaying a value of the check digit included in the barcode data produced by the barcode data producing means in a second display area of the displaying means while displaying the input character string in a first display area of the displaying means.

A system for producing barcode data of the invention having inputting means for inputting a character string defined by a barcode standard, displaying means for displaying the input character string, and barcode data producing means for producing barcode data including the input character string and a special digit character not directly input by an operator, the system for producing barcode data includes display controlling means for displaying information on a special digit character included in the barcode data produced by the barcode data producing means in a second display area of the displaying means while displaying the input character string and a cursor in a first display area of the displaying means; and cursor moving means for capturing a direction for moving the cursor to move the cursor, wherein the display controlling means displays the information on the special digit character displayed in the second display area in different modes based on whether a position of the cursor is located at a position of the special digit character or a position of other characters in the first display area.

A method for producing barcode data of the invention having the steps of inputting a character string defined by a barcode standard and producing barcode data including the input character string and a check digit not directly input by an operator, the method for producing barcode data includes the step of displaying and controlling a value of the check digit included in the barcode data produced through the barcode data producing step in a second display area of displaying means while displaying the input character string in a first display area of the displaying means.

A method for producing barcode data of the invention having the steps of inputting a character string defined by a barcode standard and producing barcode data including the input character string and a special digit character not directly input by an operator, the method for producing barcode data includes the steps of displaying and controlling information on a special digit character included in the barcode data produced through the barcode data producing step in a second display area of displaying means while displaying the input character string and a cursor in a first display area of the displaying means; and capturing a direction for moving the cursor to move the cursor, wherein the displaying and controlling step displays the information on the special digit character displayed in the second display area in different modes based on whether a position of the cursor is located at a position of the special digit character or a position of other characters in the first display area.

In a program for producing barcode data of the invention, each step of a method for producing barcode data is described in code which can be executed by a computer.

BRIEF DESCRIPTION OF THE DRAWINGS

FIG. 9 is an explanatory view of a method for displaying a check digit and the like of the embodiment.

DETAILED DESCRIPTION OF THE INVENTION

A preferred embodiment in which a system, a method, and a program for producing barcode data according to the invention are applied to a tape printing system, a tape printing method, and a tape printing program will be described below.

Figure 1:
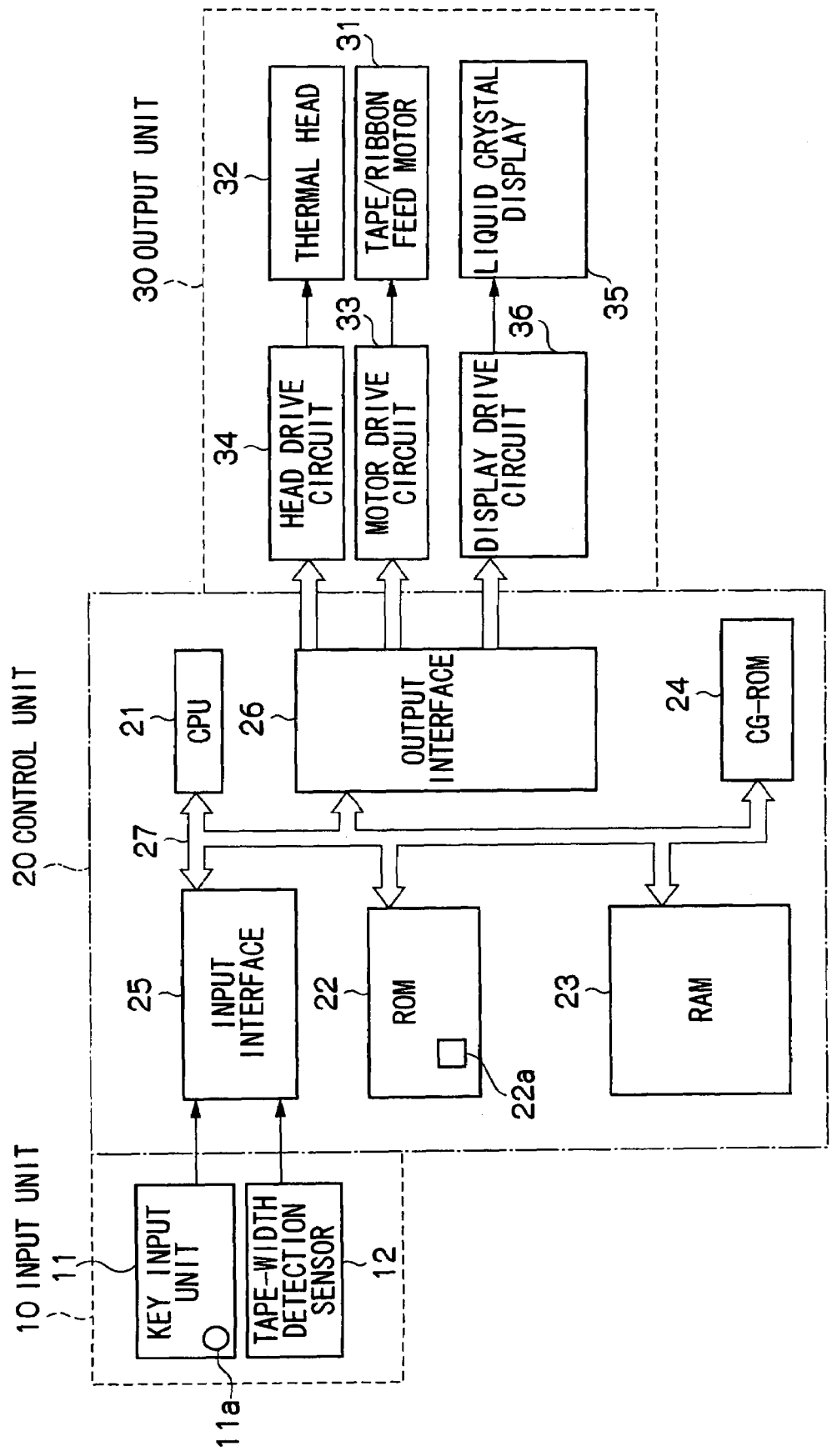
FIG. 1 is a block diagram showing an electric configuration of an embodiment.

FIG. 1 is a block diagram showing an overall configuration of the tape printing system of the embodiment. The tape printing system (tape printing apparatus) of the embodiment is formed as an independent apparatus dedicated to the tape printing.

In FIG. 1, the tape printing apparatus of the embodiment of the invention includes an input unit 10, a control unit 20, and an output unit 30. The control unit 20 is adapted to perform process according to information from the input unit 10 or a process stage at that time, and the output unit 30 is adapted to output a display image or a print image of the process result and the like.

The input unit 10 includes a key input unit 11 having a press-down key (or dial key) and a tape-width detection sensor 12. The detail configuration of the press-down key is omitted. The key input unit 11 generates character codes and various pieces of control data which are supplied to the control unit 20. The tape-width detection sensor 12 detects a loaded tape width and provides the tape width information to the control unit 20. In this case, a barcode mode key 11a which shifts a mode to a barcode input and print mode (barcode mode) is also provided in the key input unit 11. It is possible that the barcode mode key 11a is formed by a dedicated key, a key used both as the barcode mode key and another function, or a group of keys operated in a predetermined procedure.

The output unit 30 includes a print configuration and a display configuration. For example, a tape/ribbon feed motor 31 including a stepping motor or a direct-current motor feeds a tape or an ink ribbon (not shown) to a predetermined print position and the outside of the apparatus. For example, in this case, it is assumed that a printhead 32 is a thermal head. The thermal head 32 performs the printing to the running tape by thermal transfer while fixed. Under the control of the control unit 20, a motor drive circuit 33 drives the tape/ribbon feed motor 31, and a head drive circuit 34 drives the thermal head 32. A cutter (not shown) which is driven by external force from a user or a motor performs the cutting of the printed tape.

A liquid crystal display 35 is provided as a display unit of the tape printing apparatus. The liquid crystal display 35 can display the characters having a predetermined size in several lines (for example, four lines) of several characters (for example, six characters). A display drive circuit 36 drives the liquid crystal display 35 under the control of the control circuit 20.

A display surface of the liquid crystal display 35 includes a character display area, a line number indicator, and attribute indicators. The character display area indicates the input characters and the like. The line number indicator indicates an input state of each line of the input character string and the like. The attribute indicators indicate various attributes concerning the input character string. In the attribute indicators, the corresponding attribute shown by the characters described in a periphery of the display surface is adopted, when the corresponding attribute indicator is turned on. The attributes indicated by the attribute indicators include a size of the character, inputting methods such as kana character input or Roman character input, a unit of a certain amount of characters such as vertical writing or central justification, a character unit such as decorative characters alphabetic characters, and the indication whether a basic format is adopted or not.

Referring back to FIG. 1, for example, the control unit 20 includes a microcomputer. The control unit 20 includes a CPU 21, a ROM 22, a RAM 23, a character generator ROM (CG-ROM) 24, an input interface 25, an output interface 26, and a system bus 27. The CPU 21, the ROM 22, the RAM 23, the character generator ROM (CG-ROM) 24, the input interface 25, and the output interface 26 are connected to one another through the system bus 27.

The ROM 22 includes one or at least two ROM chips. Various processing programs and various pieces of fixed data such as kana-kanji conversion dictionary data are stored in the ROM 22. For example, a program 22a for executing the barcode mode is also stored in the ROM 22.

The RAM 23 includes one or at least two RAM chips, and the RAM 23 is used as a working memory. The RAM 23 also includes the fixed data with respect to user input and the like. Although the RAM 23 is simply shown as a random access memory in FIG. 1, the RAM 23 has a broad concept including other memory devices such as an EEPROM used as a working memory. The RAM 23 has a print buffer, a display buffer, a text buffer, a line-number indicator status retention buffer, and an attribute indicator status retention buffer. The print buffer performs dot expansion of the character string to be printed and holds the dot-expanded character string. Display images for the input character string and the input barcode string are stored in the display buffer. Various pieces of character data concerning the printing and the input are stored in the text buffer. The line-number indicator status retention buffer retains a display mode for the line number indicator. The attribute indicator status retention buffer retains the display mode for the attribute indicators.

Dot patterns of the characters and symbols, which are prepared for the tape printing apparatus, are stored in the CG-ROM 24. The CG-ROM 24 outputs the corresponding dot pattern when code data for specifying the character or the symbol is added. It is possible that the CG-ROM for display and the CG-ROM for printing are separately provided. It is possible that a storage format of font information is either an outline font format or a bit map format. Not only the dot pattern of the barcode corresponding to a certain character may be stored in the CG-ROM 24, but also the parameter data such as a line width and a line interval may be stored in the ROM 22 to be caused to correspond to the dot pattern of the barcode.

The input interface 25 functions as an interface between the input unit 10 and the control unit 20, and the output interface 26 functions as the interface between the output unit 30 and the control unit 20.

The CPU 21 executes the processing program which is stored in the ROM 22 and determined according to an input signal from the input unit 10 or a process stage at that time while utilizing the RAM 23 as the working area or appropriately using the fixed data stored in the ROM 22 or the RAM 23 if necessary. The CPU 21 causes the liquid crystal display 35 to display a processing status or process result or causes the thermal head 32 to print the process result in the tape (not shown).

Then, the action of the tape printing apparatus (tape printing method) of the embodiment will be described. A major feature of the embodiment is the action in inputting the character string expressed by the barcode. In the following description, the whole procedure for printing the barcode is explained, and then the input action of the barcode character string is explained.

Figure 2:
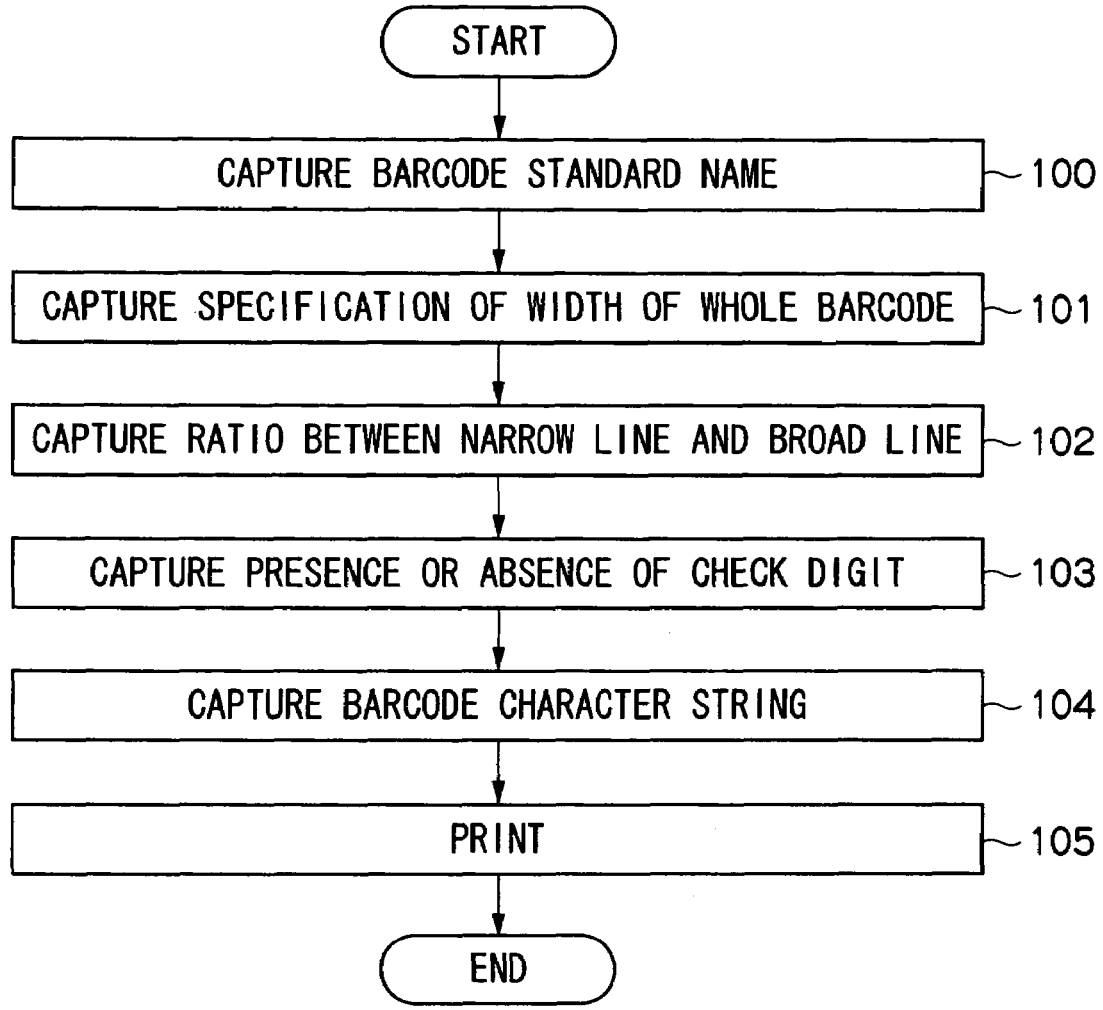
FIG. 2 is a flowchart schematically showing printing processes for inputting barcode information of the embodiment.

When the barcode mode key 11a is operated, the CPU 21 starts a barcode mode executing program 22a shown by a flowchart of FIG. 2. The following example can be cited as an example of the operation of the barcode mode key 11a. A screen including alternatives of "continuous number" and "barcode" is displayed by simultaneously operating predetermined two kinds of keys, and the barcode mode executing program 22a is started by the key operation for selecting the alternative of "barcode" in the display screen.

After the CPU 21 starts the barcode mode executing program 22a shown in FIG. 2, the CPU 21 captures the information (standard name) on the standard of the barcode which is printed (Step 100). For example, the display screen in which a title is "barcode" and the barcode standard names such as "ITF", "NW-7", and "UPC-A" are included as the alternatives is displayed to capture the barcode standard name which is intended by the user. At this point, a scroll displaying process is appropriately performed when the number of alternatives is larger compared with the number of display lines of the liquid crystal display 35 (the same process is also performed in other selection screens).

After the CPU 21 captures the barcode standard name, the CPU 21 captures specification of how much width of the whole barcode is formed (Step 101). For example, the CPU 21 displays the display screen, in which the title is "width of whole barcode" and "small", "intermediate", and "large" are included as the alternatives, in order to capture the width of the whole barcode which is intended by the user. The CPU 21 also captures the specification of how much ratio between a narrow line and a broad line is set (Step 102). For example, the CPU 21 displays the display screen, in which the title is "ratio between narrow line and broad line" and "2.0", "2.5", and "3.0" are included as the alternatives, in order to capture the ratio between a narrow line and a broad line which is intended by the user. Then, the CPU 21 captures the specification whether the check digit is added or not (Step 103). For example, the display screen in which the title is "C/D" and "presence" and "absence" are included as the alternatives is displayed to capture the presence or absence of the addition of the check digit which is intended by the user.

The process of capturing the width of the whole barcode, the process of capturing the ratio between the narrow line and the broad line, and the process of capturing the presence or absence of the addition of the check digit are appropriately neglected depending on the selected barcode standard (name).

Figure 3:
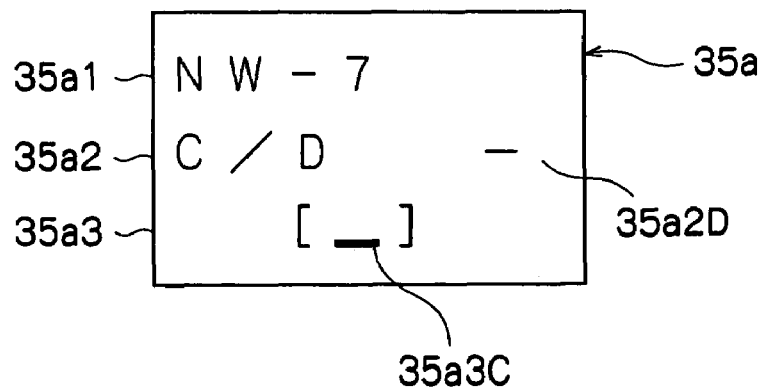
FIG. 3 is an explanatory view showing an example of a barcode input display screen of the embodiment.

When the process of capturing the presence or absence of the addition of the check digit is ended, the CPU 21 displays the input screen of the barcode character string as illustrated in FIG. 3 to capture the character string (barcode character string) expressed by the barcode (Step 104). Then, when the user starts the printing, the CPU 21 prints the barcode image concerning the input character string in the loaded tape (Step 105).

The detail process of capturing the barcode character string is described later (see FIGS. 4 to 8). When the user directs the end of the input of the barcode character string, it is also possible that the print image of the barcode image to be printed is displayed on the liquid crystal display 35 to transfer the process of printing the barcode image by the operation of confirmation (for example, operation of "an execution key"). When the number of input characters is excessive or too small in starting up the printer by the user, or when the character not permitted is used, an error process is performed such that an error message is displayed on the liquid crystal display 35.

As shown in FIG. 3, an input screen 35a of the barcode character string has a line 35a1 for indicating the barcode standard, a line 35a2 for indicating the selection of the addition of the check digit, and a line 35a3 for indicating the input character string.

FIG. 3 shows the case in which "NW-7" is specified as the barcode standard and the addition of the check digit is selected. When the addition of the check digit is not selected the line 35a2 becomes a blank line. When the addition of the check digit is selected, "C/D" indicating the selection of the addition of the check digit is displayed in the first half of the line 35a2, and the check digit value is displayed in a predetermined position 35a2D in the second half of the line 35a2. When no character of the barcode character string is input as shown in FIG. 3, "–" indicating the display position of the check digit value is displayed in the predetermined position 35a2D. The line 35a3 for indicating the input character string includes a character string input field sandwiched by "[" and "]", and the character string sandwiched by "[" and "]" indicates the barcode character string. A cursor 35a3C is also displayed in the input field. In FIG. 3, a lateral cursor like an under line is shown as the cursor 35aC. However, it is also possible that a longitudinal cursor and cursors having other display modes are used as the cursor 35a3C.

FIGS. 4 to 8 are a flowchart showing the detail process of capturing the barcode character string by the CPU 21.

When the process of capturing the presence or absence of the addition of the check digit is ended, as described above, the CPU 21 enters the process of capturing the barcode character string. The CPU 21 produces (an initial image of) the input image of the character string shown in FIG. 3 to display the input image on the liquid crystal display 35 (Step 200). Then, the CPU 21 waits for the key input (Step 201). When any one of keys is operated in waiting for the key input, the CPU 21 determines the operated key (Step 202). When the operated key is a character key, the CPU 21 performs a process routine shown in FIG. 5 (Step 203), and then the CPU 21 returns the input waiting state. When the operated key is a cursor leftward moving key (including the case in which an upward moving key is regarded as the same key), the CPU 21 performs the process routine shown in FIG. 6 (Step 204), and then the CPU 21 returns the input waiting state. When the operated key is a cursor rightward moving key (including the case in which a downward moving key is regarded as the same key), the CPU 21 performs the process routine shown in FIG. 7 (Step 205), and then the CPU 21 returns the input waiting state. When the operated key is a delete key, the CPU 21 performs the process routine shown in FIG. 8 (Step 206), and then the CPU 21 returns the input waiting state. Although the process is neglected when the operated key is other keys, it transferred to the process of printing the barcode image (Step 105) when the operated key is a print start key.

Figure 4:
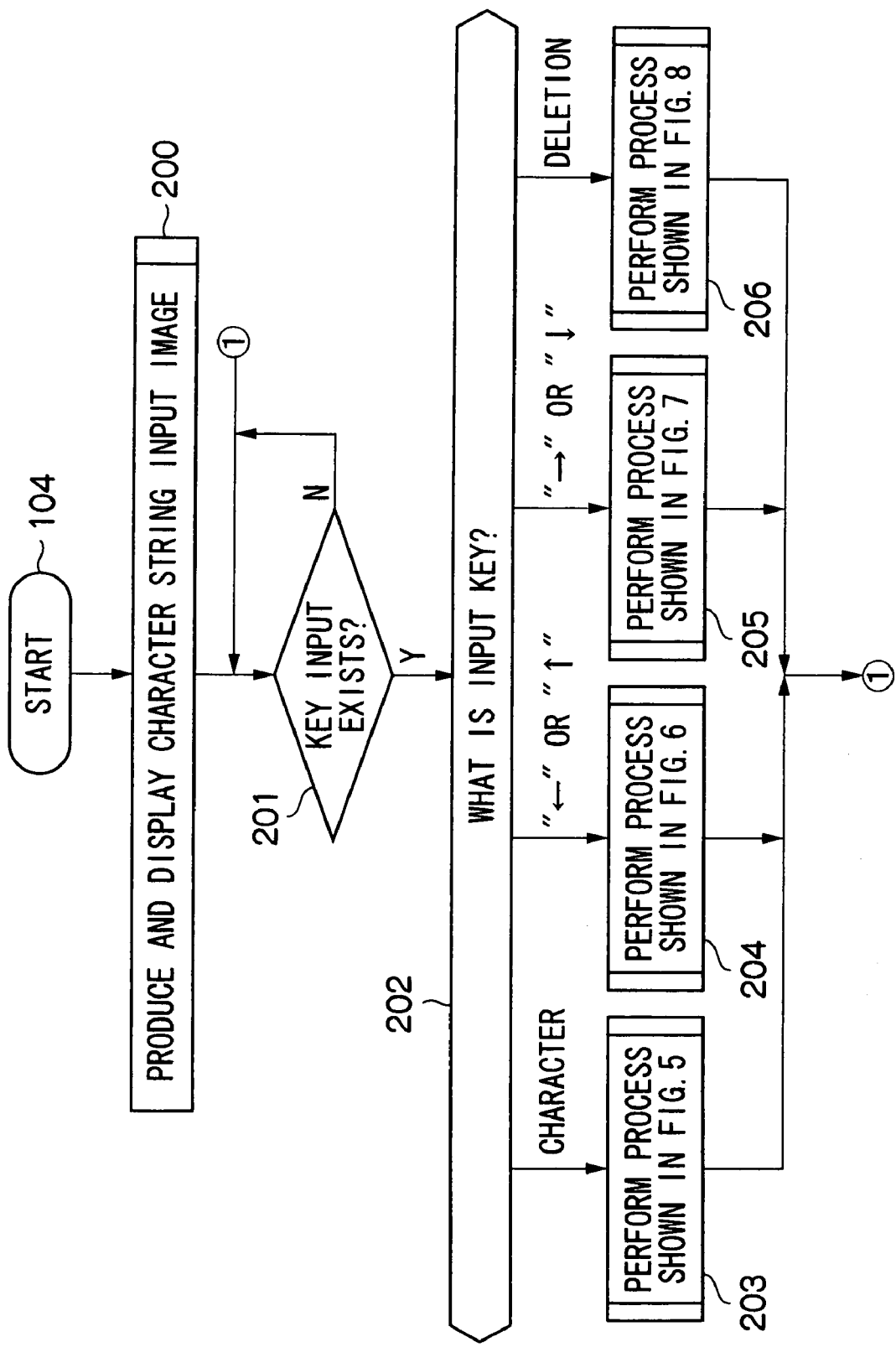
FIG. 4 is a flowchart showing a process for inputting the barcode information of the embodiment.
Figure 5:
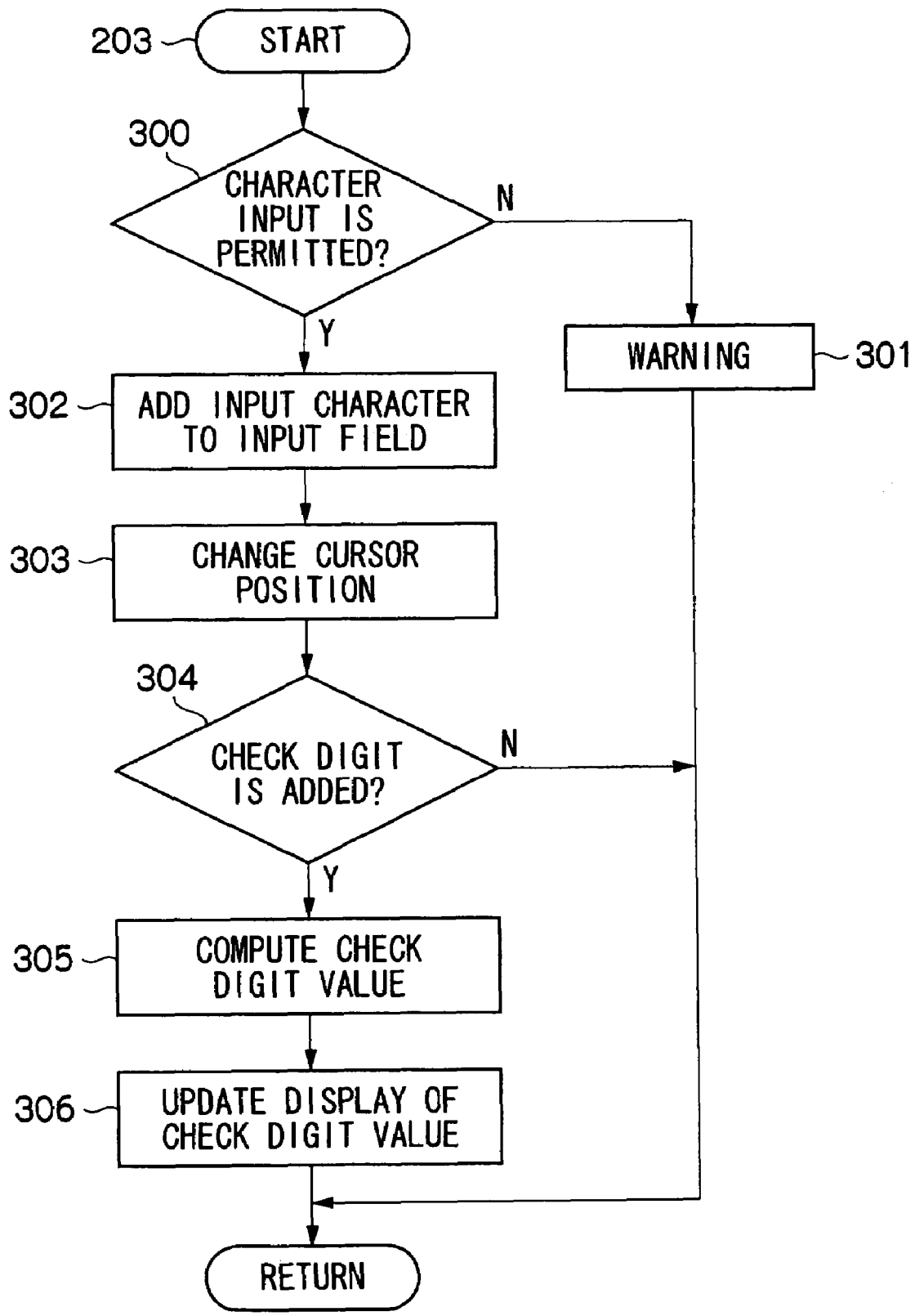
FIG. 5 is a flowchart showing a detail of Step 203 of FIG. 4.

When the character key is operated, as shown in FIG. 5, the CPU 21 confirms whether or not the currently input character is the character in which the input is permitted in the specified barcode standard, or the CPU 21 confirms whether or not the cursor indicates the check digit position and is located at a position where the input character can not be accepted (Step 300). When the currently input character is not the permitted character, or when the cursor indicates the check digit position, the CPU 21 performs the error process such as an issue of a warning (Step 301), and then the CPU returns the process shown in FIG. 4. When the currently input character is the permitted character and the cursor does not indicate the check digit position, while the CPU 21 adds the currently input character to the character string input field (see FIG. 3) (Step 302), the CPU 21 updates the cursor display position so as to be able to respond to the character input next to the added character (Step 303).

Then, the CPU 21 decides whether the specification state becomes the state in which the check digit (C/D) is added or not (Step 304). When the specification state is in the state in which the check digit is not added, the CPU 21 immediately returns the process shown in FIG. 4. When the specification state is in the state in which the check digit is added, the CPU 21 computes the check digit value again while the currently input character is included (Step 305), and the CPU 21 displays the check digit value in the check digit value display position 35a2D (see FIG. 3) (Step 306) to return the process shown in FIG. 4.

Figure 6:
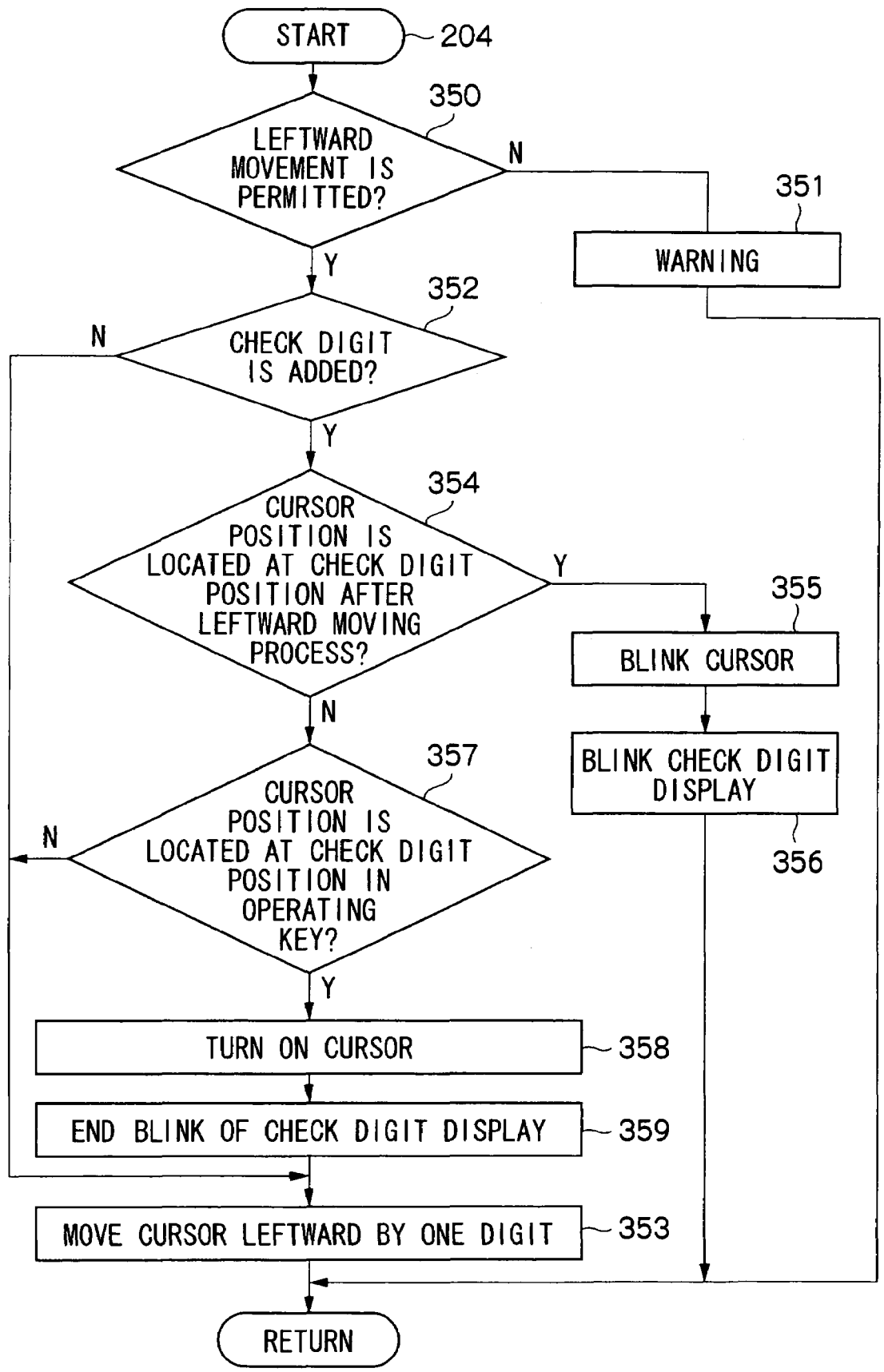
FIG. 6 is a flowchart showing a detail of Step 204 of FIG. 4.

When the cursor leftward moving key is operated, as shown in FIG. 6, the CPU 21 confirms whether the cursor position is located in the position where the leftward movement is permitted or not (Step 350). For example, when the cursor position is not located at the position where the leftward movement is permitted such that the cursor is located at the leftmost digit (character position), the CPU 21 issues the warning that the current key operation cannot be accepted to return the process shown in FIG. 4 (Step 351).

When the cursor position is located at the position where the leftward movement is permitted, the CPU 21 determines whether the setting becomes the state in which the check digit is added or not (Step 352). When the setting becomes the state in which the check digit is not added, the CPU 21 moves the cursor position leftward by one digit (Step 353), and then the CPU 21 returns the process shown in FIG. 4.

When the setting becomes the state in which the check digit is added, the CPU 21 determines whether the cursor position is located at the check digit position or not after the leftward moving process (Step 354).

As described above, the line 35a3 is the line for indicating the input character string, and the check digit is not displayed in the line 35a3. In the embodiment, although the check digit is not displayed in the line 35a3, the line 35a3 is adapted so that the user can recognize the check digit position by the cursor position and the display mode. At this point, it is assumed that the barcode standard forms the barcode image concerning the total of eight characters of the input seven characters and one check digit and the check digit position is located at the sixth position in the total of eight characters. In this case, when the cursor is located at the sixth position in the seven characters which do not include the check digit (the position of one character before the final character when the number of input characters does not reach the seven characters), there are two display modes. The first display mode is the general display mode as the cursor (for example, turn-on). In this case, the character of the sixth position becomes the subject. The second display mode is the special display mode as the cursor (for example, blink). In this case, the character of the sixth position where the cursor is located is not the subject, but the check digit is located at the front of the character of the sixth position in the barcode image.

For example, the determination in Step 354 is one whether the cursor leftward moving key is operated or not in the cursor display state in which the character of the sixth position is the subject.

When the cursor position is located at the check digit position after the leftward moving process, while the CPU 21 changes the cursor display mode from the general display mode to the special display mode (Step 355), the CPU displays "C/D" in the first half of the line 35a2 and/or the check digit value in the second half of the line 35a2 in the mode which encourages the user to pay attention (for example, blink) (Step 356), and then the CPU 21 returns the process shown in FIG. 4. In this case, the cursor display mode is changed. Although the user is notified of the check digit position in an ideological manner, the cursor position is not changed on the physical display.

When the cursor position does not become the check digit position after the leftward moving process, the CPU 21 determines whether the cursor position is located at the check digit position or not in operating the key (Step 357). When the cursor position is not located at the check digit position, the CPU 21 moves the cursor position leftward by one digit (Step 353), and then the CPU 21 returns the process shown in FIG. 4.

When the cursor position is located at the check digit position and the cursor leftward moving key is operated, while the CPU 21 returns the cursor display mode from the special display mode to the general display mode (Step 358), the CPU 21 ends the display for encouraging the user to pay attention to "C/D" in the first half of the line 35a2 and/or the check digit value in the second half of the line 35a2 (Step 359). Then, the CPU 21 moves the cursor position leftward by one digit (Step 353), and the CPU 21 returns the process shown in FIG. 4.

Figure 7:
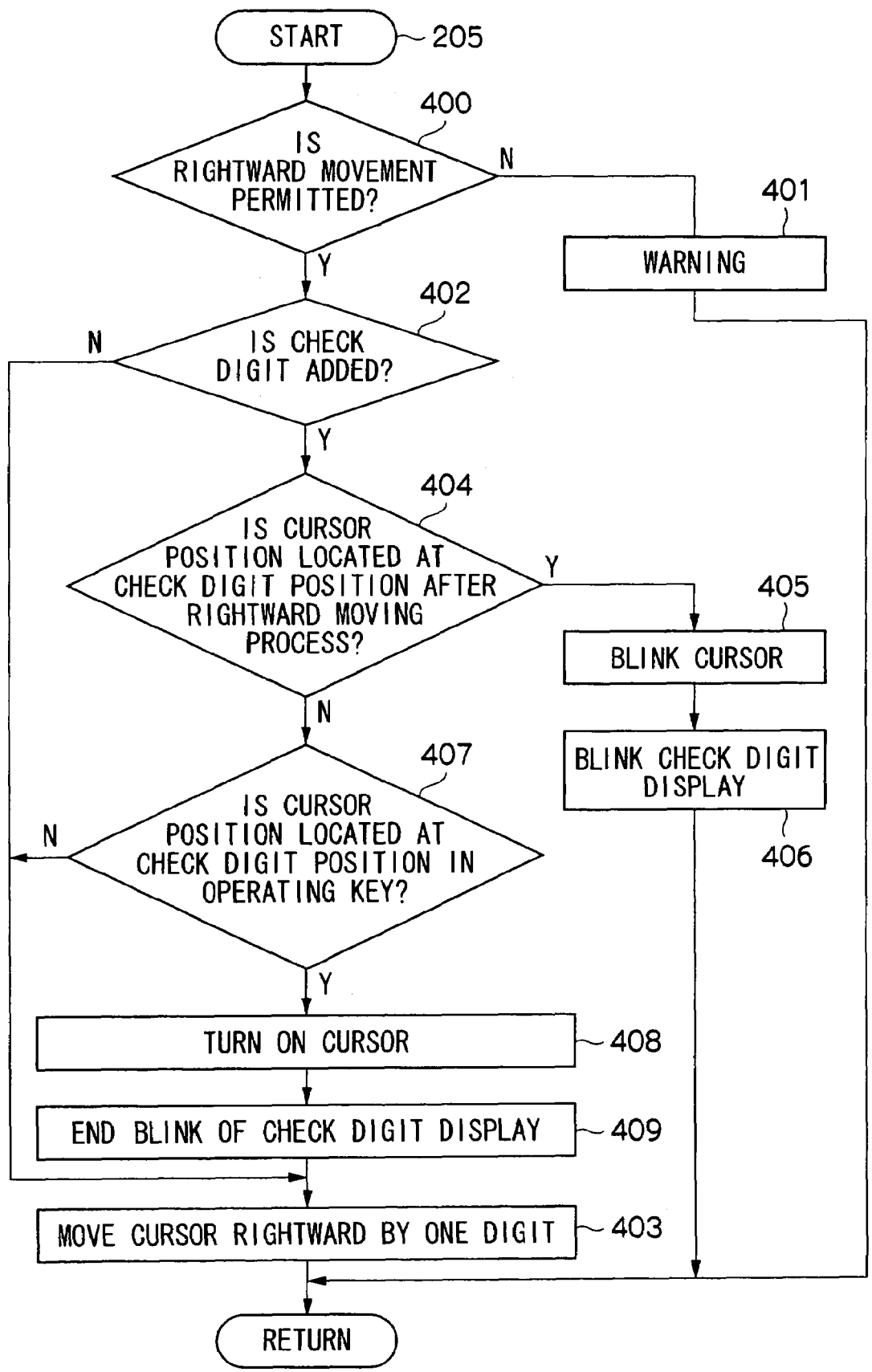
FIG. 7 is a flowchart showing a detail of Step 205 of FIG. 4.

When the cursor rightward moving key is operated, the CPU 21 performs the detail process shown in FIG. 7. The process shown in FIG. 6 in the case of the operation of the cursor leftward moving key differs from the process shown in FIG. 7 only in the cursor moving direction, so that the detail description of the process shown in FIG. 7 is neglected.

Figures 8, 10:
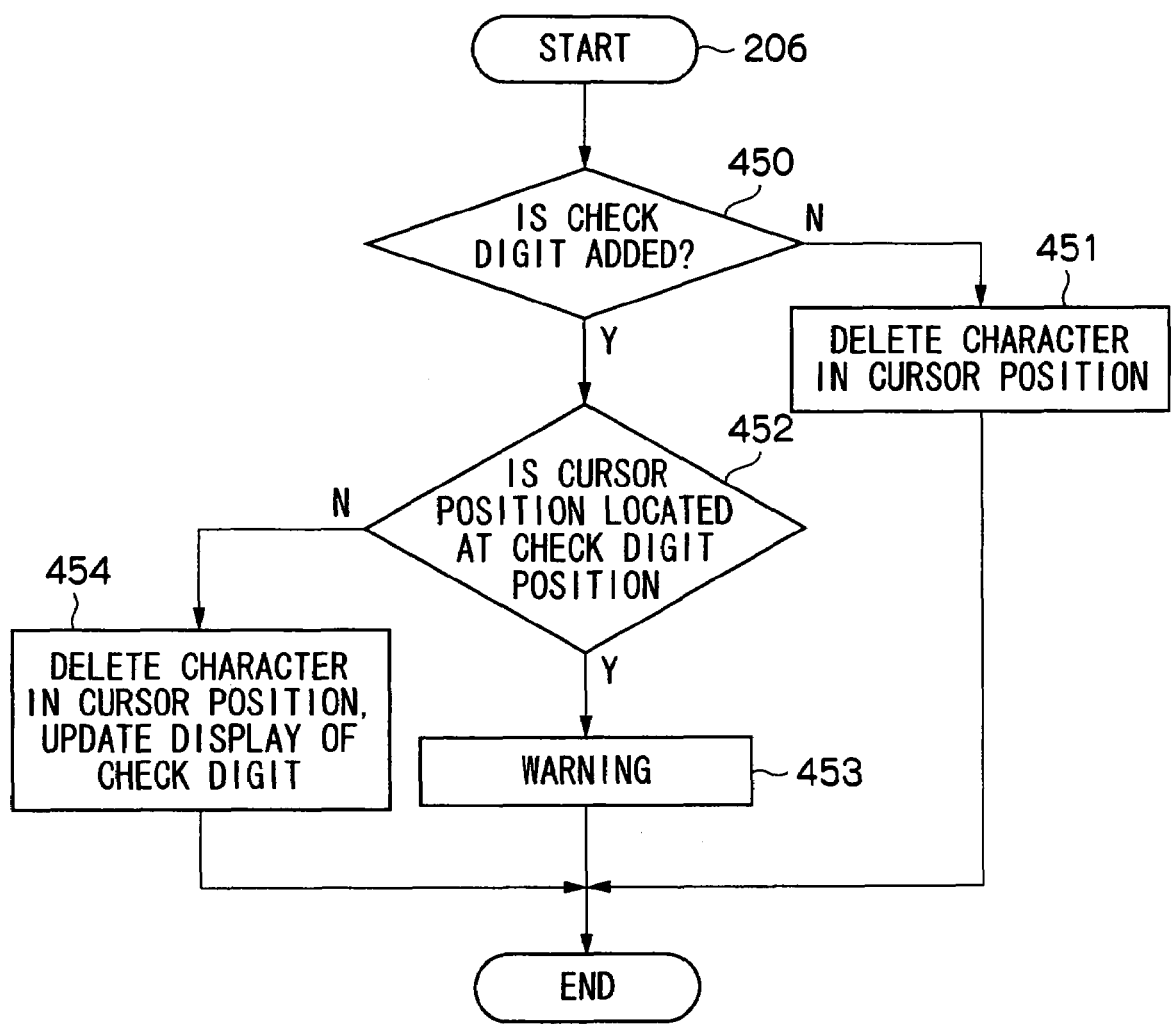
FIG. 8 is a flowchart showing a detail of Step 206 of FIG. 4.
FIG. 10 is an explanatory view of a method for displaying a check digit and the like of another embodiment.

When the delete key is operated, as shown id FIG. 8, the CPU 21 determines whether the setting is in the state in which the check digit is added or not (Step 450). When the setting is not in the state in which the check digit is added, the CPU 21 deletes the character at which the cursor is located (Step 451), and the CPU returns the process shown in FIG. 4.

When the setting is in the state in which the check digit is added, the CPU 21 determines whether the cursor position (display mode) is located at the check digit position or not (Step 452). When the cursor position (display mode) is located at the check digit position, the CPU 21 issues the warning that the current delete direction cannot be accepted (Step 453). When the cursor position (display mode) is not located at the check digit position, while the CPU 21 deletes the character at which the cursor is located, the CPU 21 computes the check digit value again to update the display of the check digit value (Step 454), and the CPU 21 returns the process shown in FIG. 4. When the input character string is eliminated by the deletion, "–" is displayed in the display column of the check digit value in the process of Step 454.

For example, as shown in FIG. 9, it is assumed that "NW-7" is selected as the barcode standard, the addition of the check digit is set, and [4912349 ] is input as the character string.

Although FIG. 9 can also be regarded as the real display screen, FIG. 9 means the virtual display screen since the whole of the input character string cannot be displayed at a time.

As described above, the normal display mode (for example, turn-on of cursor) and the special display mode (for example, blink of cursor) can be cited as the display mode in which the cursor is located at the character of "4" which is located at the second position from the right side in the input character string. When the character of "4" located at the second position from the right side is displayed in the normal display mode as shown in FIG. 9B, it is meant that the cursor is located at "4". The character of "C/D" for indicating the adoption of the addition of the check digit or the check digit value of "4" is not displayed while blinking, but the turn-on display is simply performed. On the other hand, when the character of "4" located at the second position from the right side is displayed in the special display mode as shown in FIG. 9C, it is not meant that the cursor is located at "4", but it is meant that the immediately preceding position of "4" is the check digit position. In this case, the character of "C/D" for indicating the adoption of the addition of the check digit or the check digit value of "4" is displayed while blinking.

For example, when the direction for moving the cursor leftward is issued while the cursor is located at the rightmost character of "9" as shown in FIG. 9A, the screen is changed to the display state shown in FIG. 9B in which the cursor is displayed in the normal display mode with respect to the character of "4" located at the second position from the right side. When the direction for moving the cursor leftward is issued while the cursor is located at the character of "4" located at the second position from the right side as shown in FIG. 9B, the cursor is not changed in the physical position, the display state is changed to the special display mode shown in FIG. 9C while the cursor remains at the physical position, and the character of "C/D" and the character of "4" are blinked. When the direction for moving the cursor leftward is issued while the cursor is located at the character of "4" located at the second position from the right side with the cursor displayed in the special mode as shown in FIG. 9C, the screen is changed to the display state shown in FIG. 9D in which the cursor is displayed in the normal display mode with respect to the character of "3" located at the third position from the right side.

According to the embodiment, even if the addition of the check digit is set, the check digit is adapted not to be included in the line for indicating the character string concerning the barcode, which allows the user not to misconstrue the check digit as the input character or allows the user not to misconstrue the input character as the check digit.

At this point, the addition of the check digit is set and the check digit value is displayed at the position different from the input character string, so that the user can confirm the setting of the addition of the check digit and the position of the input character string if necessary.

In the cursor movement with respect to the input character string, the user is notified of the check digit position by the display mode of the cursor or the display mode of the character and/or the check digit value which indicates that the addition of the check digit is set, so that the user can be notified of the check digit position even if the check digit is not included in the line for indicating the character string concerning the barcode.

The embodiment shows the check digit position in which the cursor is displayed in the special mode. However, in the check digit position, it is possible that the cursor is not displayed and the user is notified the check digit position by the character of "C/D" for indicating that the addition of the check digit is set or the change in display mode of the check digit value.

The special display mode of the cursor for indicating the check digit position is not limited to the embodiment. For example, it is possible to display the cursor so that the cursor spreads across the whole or a midpoint of two characters of "3" and "4" in the input character string shown in FIG. 9.

The display contents concerning the check digit are not limited to the combination of the character of "C/D" for indicating that the addition of the check digit is set and the change in display mode of the check digit value, and it is possible that other display contents are displayed as the display contents concerning the check digit. For example, it is possible that the display contents concerning the check digit are only the character of "C/D" for indicating that the addition of the check digit is set as shown in FIG. 10.

Although the case in which the special digit character is the check digit is shown in the embodiment, it is possible that the special digit character is other characters and codes such as a start code and a stop code.

In the check digit position, it is possible that the cursor is displayed in the normal display mode and the character of "C/D" for indicating that the addition of the check digit is set and the display mode of the check digit value are displayed in the normal mode. Namely, it is possible that the input character string is displayed as if the check digit does not exist and the user can confirm the presence or absence of the check digit and the check digit value by the character of "C/D" for indicating that the addition of the check digit is set and the display mode of the check digit value, which are displayed in the display area different from the input character string.

In this case, for example, when the direction for moving the cursor leftward is issued while the cursor is located at the rightmost character of "9" as shown in FIG. 9A, the screen is changed to the display state shown in FIG. 9B in which the cursor is displayed in the normal display mode with respect to the character of "4" located at the second position from the right side. When the direction for moving the cursor leftward is further issued, the screen is changed to the display state shown in FIG. 9D in which the cursor is displayed in the normal display mode with respect to the character of "3" located at the third position from the right side.

The flow of the process which realizes the above-described modification is similar to the process shown in FIG. 5 when the character is input. The flow of the process becomes the process in which Steps 352 and 354 to 359 are excluded from FIG. 6 when the cursor leftward moving key is operated. The flow of the process becomes the process in which Steps 402 and 404 to 409 are excluded from FIG. 7 when the cursor rightward moving key is operated. The flow of the process becomes the process in which Steps 452 and 453 are excluded from FIG. 8 when the delete key is operated.

Although the embodiment is directed to the barcode having the one-dimensional code, it is also possible that the invention is applied to the system provided for the two-dimensional code.

Although the tape printing system (tape printing apparatus) is shown as the dedicated machine in the embodiment, it is also possible that the invention is applied to the system including an information processing apparatus, such as a personal computer, and a label printer which is of a peripheral of the information processing apparatus. Further, it is also possible that the invention is applied to other kinds of apparatuses which have the function of producing the barcode data.

What is claimed is:

1. A system for producing barcode data comprising inputting means for inputting a character string defined by a barcode standard, displaying means for displaying the input character string, and barcode data producing means for producing barcode data including the input character string and a check digit not directly inputted by an operator,
    wherein the system for producing barcode data comprises display controlling means for displaying a value of the check digit included in the barcode data produced by the barcode data producing means in a second display area of the displaying means while displaying the input character string in a first display area of the displaying means.

2. A system for producing barcode data comprising inputting means for inputting a character string defined by a barcode standard, displaying means for displaying the input character string, and barcode data producing means for producing barcode data including the input character string and a special digit character not directly inputted by an operator, the system comprising:
    display controlling means for displaying information on the special digit character included in the barcode data produced by the barcode data producing means in a second display area of the displaying means while displaying the input character string and a cursor in a first display area of the displaying means; and
    cursor moving means for capturing a direction for moving the cursor to move the cursor,
    wherein the display controlling means displays the information on the special digit character displayed in the second display area in different modes based on whether a position of the cursor is located at a position of the special digit character or a position of other characters in the first display area.

3. A system for producing barcode data according to claim 2, wherein the display controlling means displays the cursor itself in the different modes based on whether the position of the cursor is located at the position of the special digit character or the position of other characters in the first display area.

4. A system for producing barcode data according to claim 2, wherein the display controlling means displays only the input character string and the cursor in the first display area.

5. A system for producing barcode data according to claim 2, wherein the special digit character is the check digit.

6. A method for producing barcode data comprising the steps of inputting a character string defined by a barcode standard and producing barcode data including the input character string and a check digit not directly inputted by an operator,
    the method for producing barcode data comprising the step of displaying and controlling a value of the check digit included in the barcode data produced through the barcode data producing step in a second display area of displaying means while displaying the input character string in a first display area of the displaying means.

7. A method for producing barcode data comprising the steps of inputting a character string defined by a barcode standard and producing barcode data including the input character string and a special digit character not directly inputted by an operator, the method for producing barcode data comprising the steps of:
    displaying and controlling information on a special digit character included in the barcode data produced through the barcode data producing step in a second display area of displaying means while displaying the input character string and a cursor in a first display area of the displaying means; and
    capturing a direction for moving the cursor to move the cursor,
    wherein the displaying and controlling step displays the information on the special digit character displayed in the second display area in different modes based on whether a position of the cursor is located at a position of the special digit character or a position of other characters in the first display area.

8. A method for producing barcode data according to claim 7, wherein the displaying and controlling step displays the cursor itself in the different modes based on whether the position of the cursor is located at the position of the special digit character or the position of other characters in the first display area.

9. A method for producing barcode data according to claim 7, wherein the displaying and controlling step displays only the input character string and the cursor in the first display area.

10. A method for producing barcode data according to claim 7, wherein the special digit character is the check digit.

11. A computer readable medium having encoded thereon a program for producing barcode data comprising the steps of:
    inputting a character string defined by a barcode standard; and
    producing barcode data including the input character string and a check digit not directly inputted by an operator,
    wherein each step of a method for producing barcode data including the step of displaying and controlling a value of the check digit included in the barcode data produced through the barcode data producing step in a second display area of displaying means while displaying the input character string in a first display area of the displaying means is described in code which can be executed by a computer.

12. A computer readable medium having encoded thereon a program for producing barcode data comprising the steps of inputting a character string defined by a barcode standard and producing barcode data including the input character string and a special digit character not directly inputted by an operator, the program comprising the steps of:
    displaying and controlling information on a special digit character included in the barcode data produced through the barcode data producing step in a second display area of displaying means while displaying the input character string and a cursor in a first display area of the displaying means; and capturing a direction for moving the cursor to move the cursor, wherein the displaying and controlling step which displays the information on the special digit character displayed in the second display area in different modes based on whether a position of the cursor is located at a position of the special digit character or a position of other characters in the first display area, and each step of a method for producing barcode data are described in code which can be executed by a computer.

* * * * *